(12) United States Patent
Zhou et al.

(10) Patent No.: US 12,104,669 B2
(45) Date of Patent: Oct. 1, 2024

(54) MECHANICAL BACKSTOP

(71) Applicant: NINGBO SCIENCE FULL MOTOR COMPANY LIMITED, Ningbo (CN)

(72) Inventors: Yongqiang Zhou, Ningbo (CN); Qingkui Xu, Ningbo (CN)

(73) Assignee: NINGBO SCIENCE FULL MOTOR COMPANY LIMITED, Ningbo (CN)

( * ) Notice: Subject to any disclaimer, the term of this patent is extended or adjusted under 35 U.S.C. 154(b) by 0 days.

(21) Appl. No.: 18/239,054

(22) Filed: Aug. 28, 2023

(65) Prior Publication Data

US 2024/0068537 A1  Feb. 29, 2024

(30) Foreign Application Priority Data

Aug. 29, 2022  (CN) .......................... 202211049640.2

(51) Int. Cl.
| | | |
|---|---|---|
| *F16D 67/02* | (2006.01) | |
| *F16D 41/22* | (2006.01) | |
| *F16D 43/202* | (2006.01) | |
| *F16D 59/02* | (2006.01) | |
| *F16D 127/06* | (2012.01) | |

(52) U.S. Cl.
CPC .............. *F16D 67/02* (2013.01); *F16D 41/22* (2013.01); *F16D 43/2024* (2013.01); *F16D 59/02* (2013.01); *F16D 2127/06* (2013.01)

(58) Field of Classification Search
CPC .... F16D 41/22; F16D 43/202; F16D 43/2022; F16D 43/2024; F16D 59/00; F16D 59/02; F16D 67/00; F16D 67/02; F16D 2127/06
USPC ....................................................... 192/223.3
See application file for complete search history.

(56) References Cited

U.S. PATENT DOCUMENTS

| | | | | |
|---|---|---|---|---|
| 2,834,443 A | * | 5/1958 | Olchawa ................... | F16B 1/04 192/223.3 |
| 3,667,578 A | * | 6/1972 | Johnson ................. | H02K 7/102 192/223.3 |
| 2005/0133330 A1 | * | 6/2005 | Stiefvater ............... | F16D 7/044 192/55.1 |

* cited by examiner

*Primary Examiner* — Richard M Lorence
(74) *Attorney, Agent, or Firm* — Juan Carlos A. Marquez; Marquez IP Law Office, PLLC

(57) ABSTRACT

A mechanical backstop is provided which comprises a housing, an input impact gear, a frictional plate, a floating impact gear, and an output impact gear. The floating impact gear is movably mounted between the input impact gear and the output impact gear to achieve transmission. The frictional plate is fixed relative to the housing and disposed at a side of the floating impact gear close to the input impact gear. When the input impact gear transmits a torque to the floating impact gear, the floating impact gear floats toward the output impact gear to separate from the frictional plate and transmit the torque to the output impact gear. When the floating impact gear transmits a torque reversely, the floating impact gear floats toward the input impact gear to abut against the frictional plate and achieve reverse locking.

7 Claims, 11 Drawing Sheets

MECHANICAL BACKSTOP

This application is based upon and claims priority to Chinese Patent Application No. 202211049640.2, filed on Aug. 29, 2022, the entire contents of which are incorporated herein by reference.

TECHNICAL FIELD

The present disclosure relates to the field of backstops and in particular to a mechanical backstop.

BACKGROUND

In the current intelligent home, there are various mechanical transmission devices such as electric curtain, electric height-adjustable desk, medical height-adjustable bed, and medical push rod and the like. In order to ensure safe and stable operation of the transmission devices, they are required to be able to achieve backstop function upon reverse transmission. For example, an electric curtain may move reversely due to its own weight, and a height-adjustable desk may fall due to the weight of its desktop. If a transmission device with a backstop function is used, damage to the transmission device due to reverse transmission can be avoided, thus greatly increasing the stability and safety of the system.

But, in most of the current transmission devices, braking is achieved by a clutch or a brake. Further, the clutch or brake can only achieve one-way braking. There may be many incidents, for example, power outage and the like occurring to the intelligent home during a transmission process, the transmission device may continue running due to inertia or weight, and the clutch or brake cannot quickly and smoothly achieve braking, and thus cannot ensure the transmission device reaches a predetermined position point accurately. Therefore, the object of the present disclosure is to improve the transmission device of the intelligent home to achieve bidirectional braking quickly and smoothly.

SUMMARY

In order to address the above problems, the present disclosure provides a mechanical backstop.

There is provided a mechanical backstop, which comprises a housing, an input impact gear, a frictional plate, a floating impact gear, and an output impact gear. The floating impact gear is movably mounted between the input impact gear and the output impact gear to achieve transmission. The frictional plate is fixed relative to the housing and disposed at a side of the floating impact gear close to the input impact gear. When the input impact gear transmits a torque to the floating impact gear, the floating impact gear floats toward the output impact gear to separate from the frictional plate and transmit the torque to the output impact gear. When the floating impact gear transmits a torque reversely, the floating impact gear floats toward the input impact gear to abut against the frictional plate and achieve reverse locking.

Preferably, a plurality of circumferentially-distributed first convex teeth are disposed on an end surface of the input impact gear facing toward the floating impact gear, and first oblique surfaces are disposed on side surfaces of the first convex teeth. A plurality of circumferentially-distributed second convex teeth are disposed on an end surface of the floating impact gear facing toward the input impact gear. The second convex teeth and the first convex teeth are in engagement cooperation. Second oblique surfaces corresponding to the first oblique surfaces are disposed on the second convex teeth. When the input impact gear transmits a torque to the floating impact gear, due to engagement transmission of the first convex teeth and the second convex teeth and oblique surface cooperation of the first oblique surfaces and the second oblique surfaces, the floating impact gear floats toward the output impact gear to separate from the frictional plate and transmit the torque to the output impact gear, so as to achieve normal transmission of the torque. In other words, when the input impact gear drives the floating impact gear, the floating impact gear runs from the input impact gear toward the output impact gear due to inertial force and thus separates from the frictional plate to remove the control of the frictional force of the frictional plate over the floating impact gear, thus completing normal transmission.

Preferably, the first convex teeth and/or the second convex teeth are trapezoidal teeth which promote normal torque transmission and transmission of larger torque.

Preferably, a plurality of circumferentially-distributed third convex teeth are disposed on an end surface of the floating impact gear facing toward the output impact gear, and third oblique surfaces are disposed on side surfaces of the third convex teeth. A plurality of circumferentially-distributed fourth convex teeth are disposed on an end surface of the output impact gear facing toward the floating impact gear, and fourth oblique surfaces are disposed on side surfaces of the fourth convex teeth. The fourth convex teeth and the third convex teeth are in engagement cooperation, and the fourth oblique surfaces and the third oblique surfaces are in corresponding cooperation. When a torque is reversely transmitted from the output impact gear to the floating impact gear, due to engagement transmission of the fourth convex teeth and the third convex teeth and oblique surface cooperation of the fourth oblique surfaces and the third oblique surfaces, the floating impact gear floats toward the input impact gear to abut against the frictional plate so as to achieve reverse locking. In other words, when the output impact gear drives the floating impact gear, the floating impact gear runs from the output impact gear toward the input impact gear due to inertial force to abut against the frictional plate and thus the floating impact gear is reversely locked due to a frictional resistance of the frictional plate.

Preferably, the third convex teeth and/or the fourth convex teeth are trapezoidal teeth which promote normal torque transmission and transmission of larger torque.

Preferably, an elastic piece is disposed inside the housing, and the elastic piece is used to produce an elastic acting force for moving the floating impact gear toward the frictional plate.

Preferably, the elastic piece is a thrust spring disposed in a mounting chamber in the housing. An end of the thrust spring is connected with an inner wall of the mounting chamber and the other end of the thrust spring is connected with an end of the floating impact gear corresponding to the output impact gear.

Preferably, the frictional plate is an annular structure. A plurality of circumferentially-distributed magnetic modular sheets are disposed in the frictional plate. The magnetic modular sheets and the floating impact gear achieve magnetic attraction cooperation.

Preferably, a central shaft hole connected with a transmission shaft of an external motor is disposed on the input impact gear.

Preferably, the output impact gear is connected with an output shaft which protrudes out of the housing.

Beneficial effects: in the present disclosure, in a usual state, the input impact gear transmits a torque to the floating impact gear, and the floating impact gear floats toward the output impact gear to separate from the frictional plate and transmit the torque to the output impact gear, thus completing normal torque transmission. When the output impact gear reversely transmits a torque to the floating impact gear, the floating impact gear floats toward the input impact gear to abut against the frictional plate, so as to achieve reverse locking. The present disclosure has the advantages of quick locking and simple structure, and can achieve the beneficial effects of reverse braking smoothly.

Figure 1:
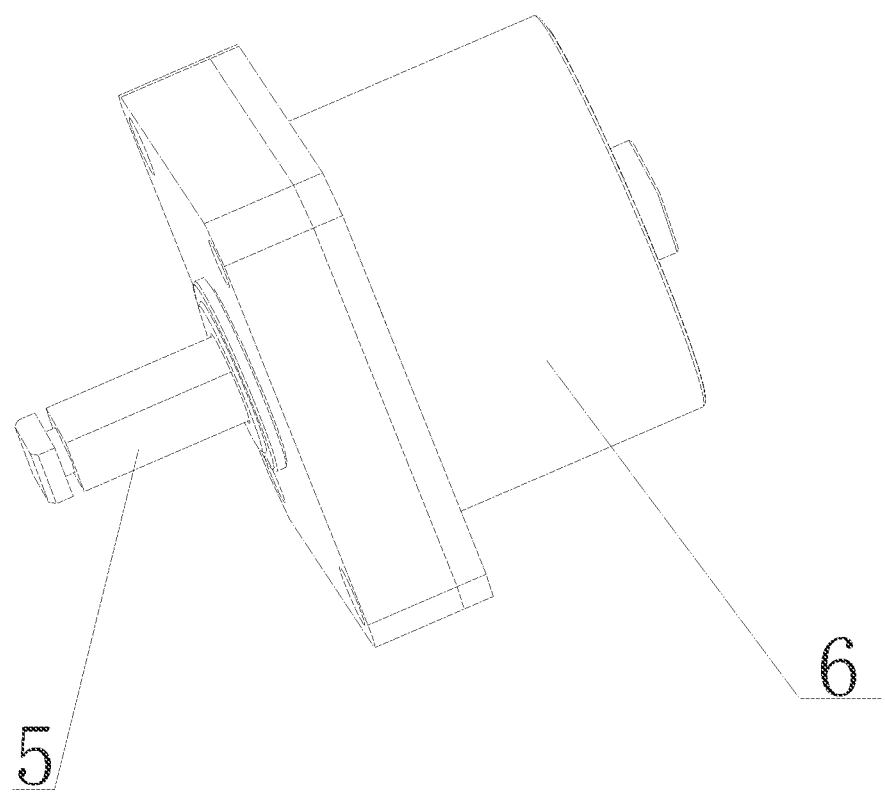
FIG. 1 is a structural schematic diagram of an embodiment 1 of the present disclosure.
Figure 2:
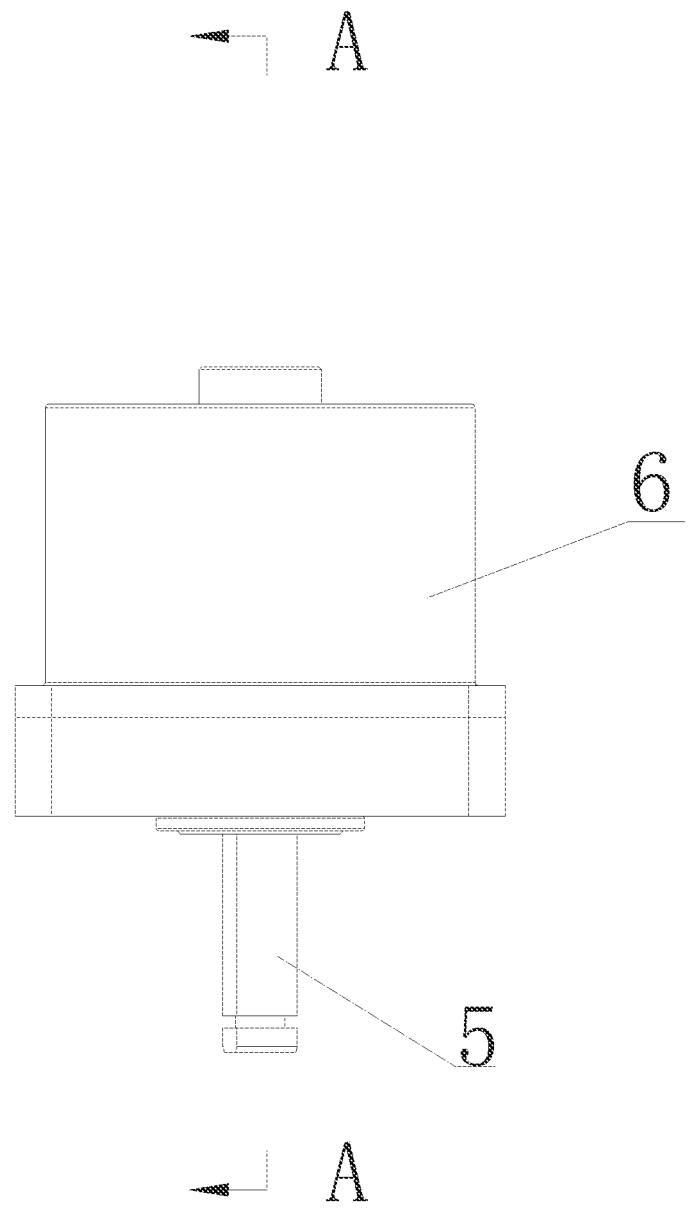
FIG. 2 is a front view of an embodiment 1 of the present disclosure.
Figure 3:
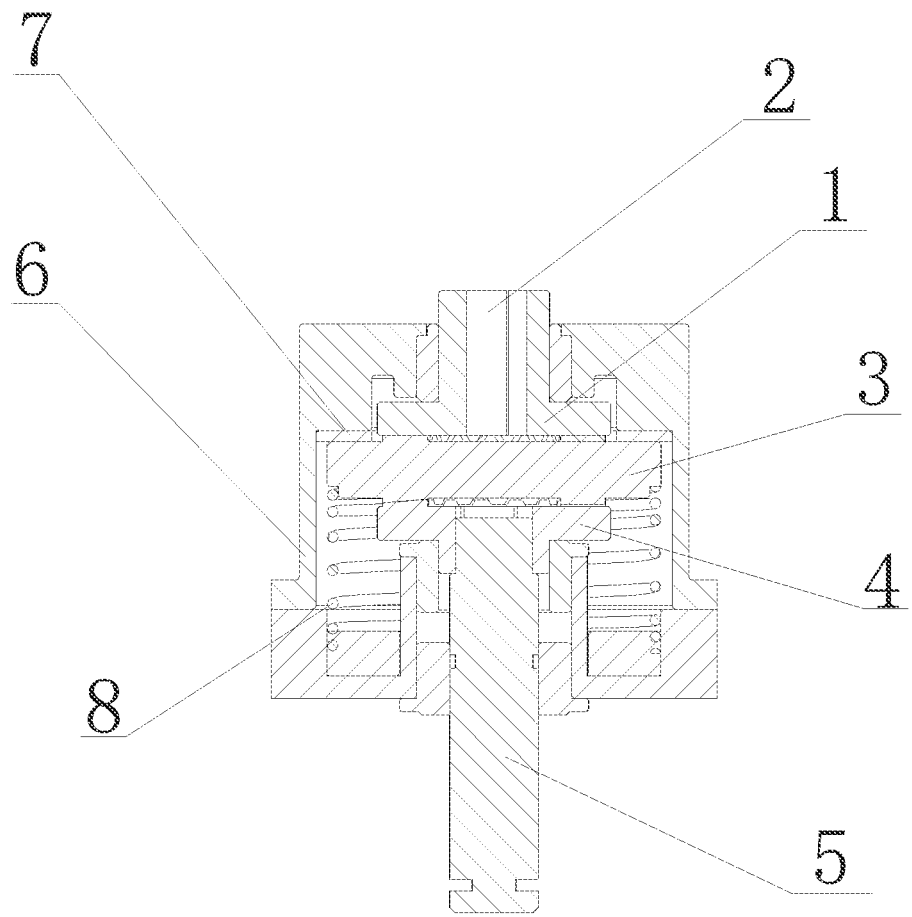
FIG. 3 is a sectional view taken along A-A in FIG. 2.
Figure 4:
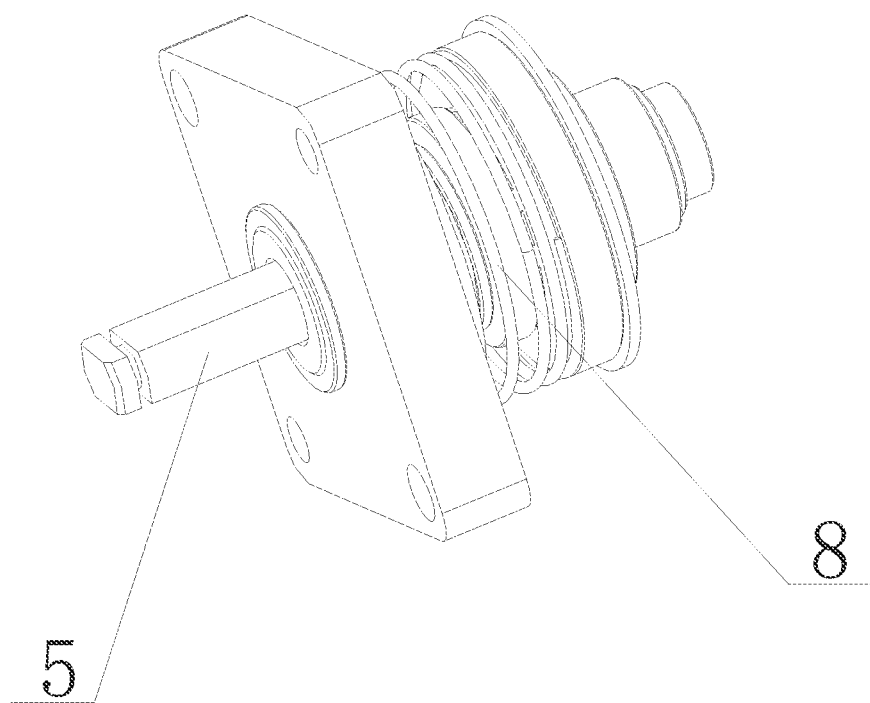
FIG. 4 is a schematic diagram illustrating an internal structure of an embodiment 1 of the present disclosure.
Figure 5:
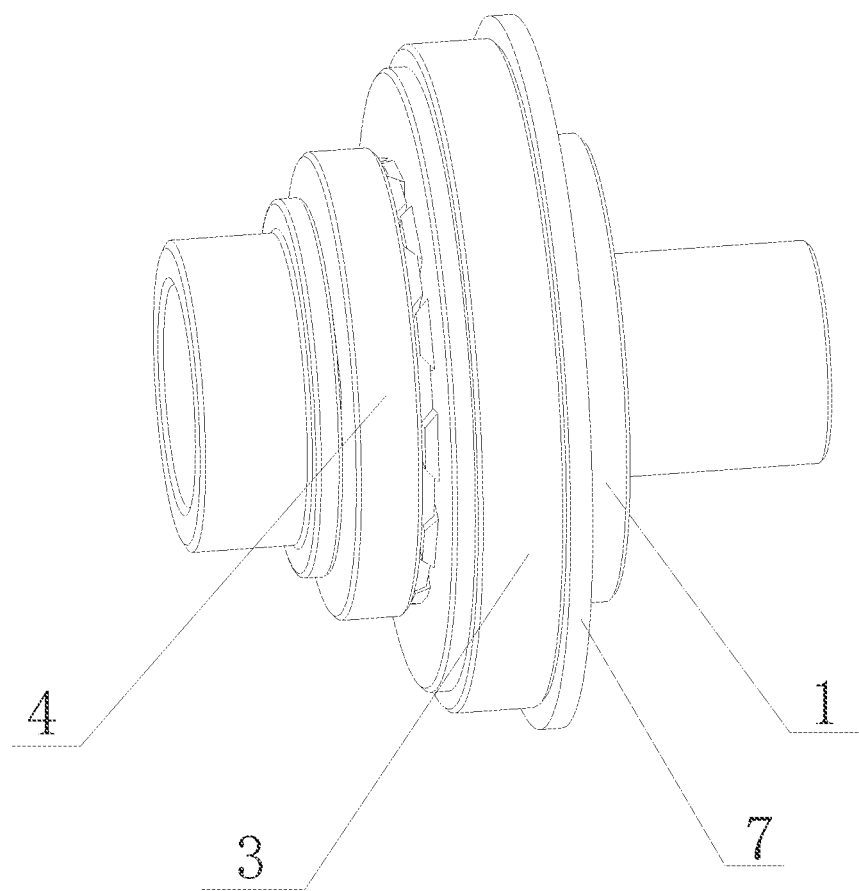
FIG. 5 is a partial structure diagram of an embodiment 1 of the present disclosure.
Figure 6:
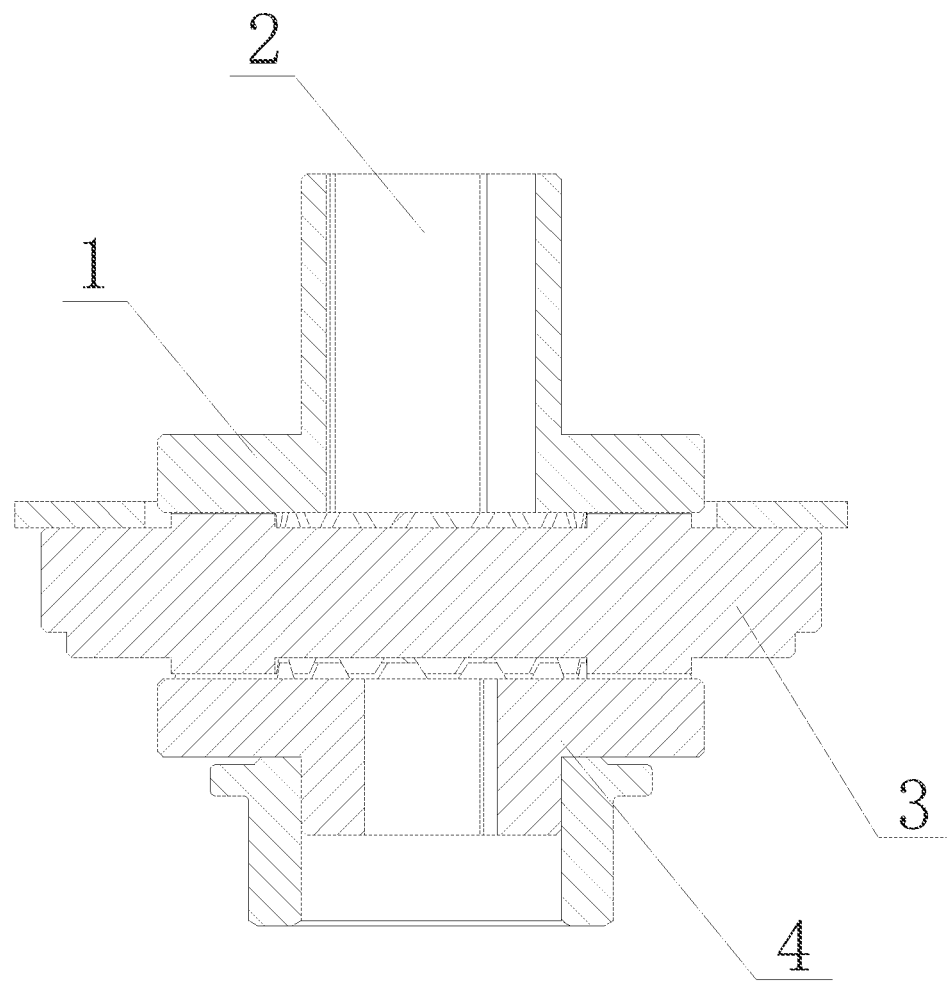
FIG. 6 is a partial sectional view of an embodiment 1 of the present disclosure.
Figure 7:
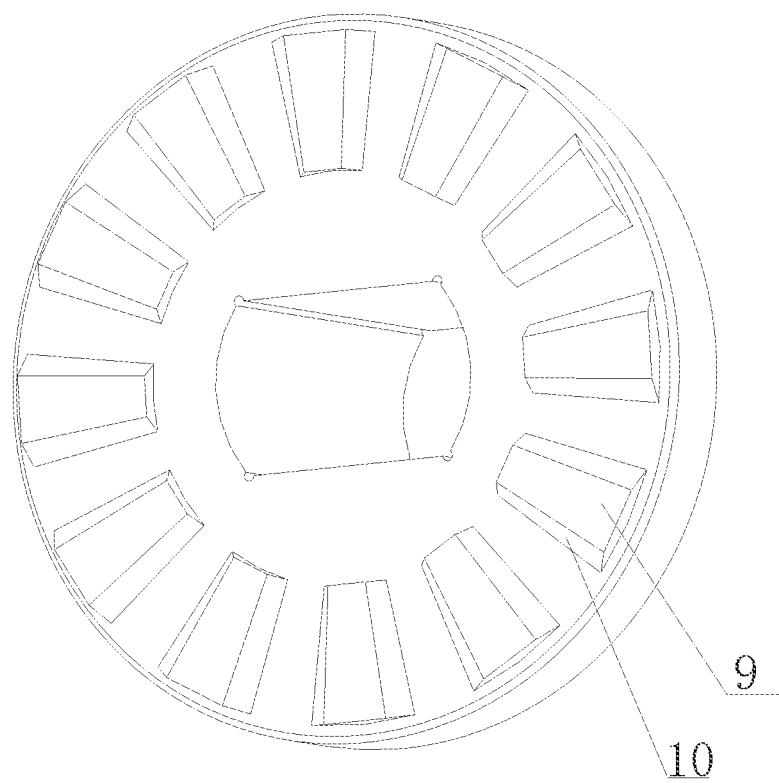
FIG. 7 is a structural diagram of an input impact gear of an embodiment 1 of the present disclosure.
Figure 8:
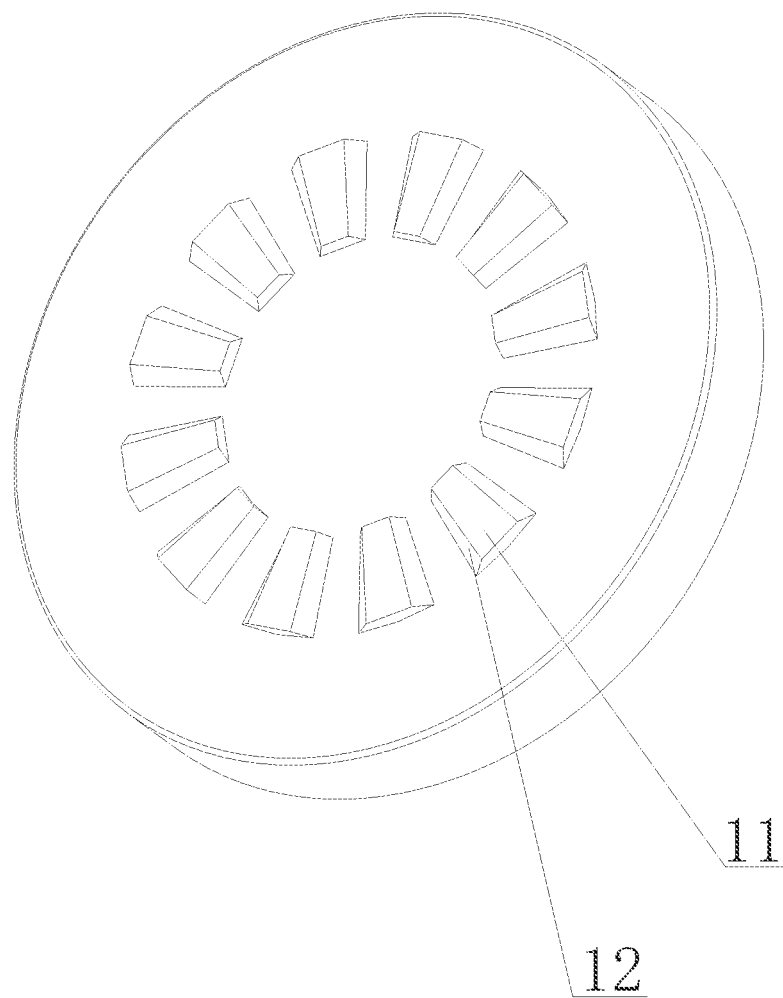
FIG. 8 is a structural diagram 1 of a floating impact gear of an embodiment 1 of the present disclosure.
Figure 9:
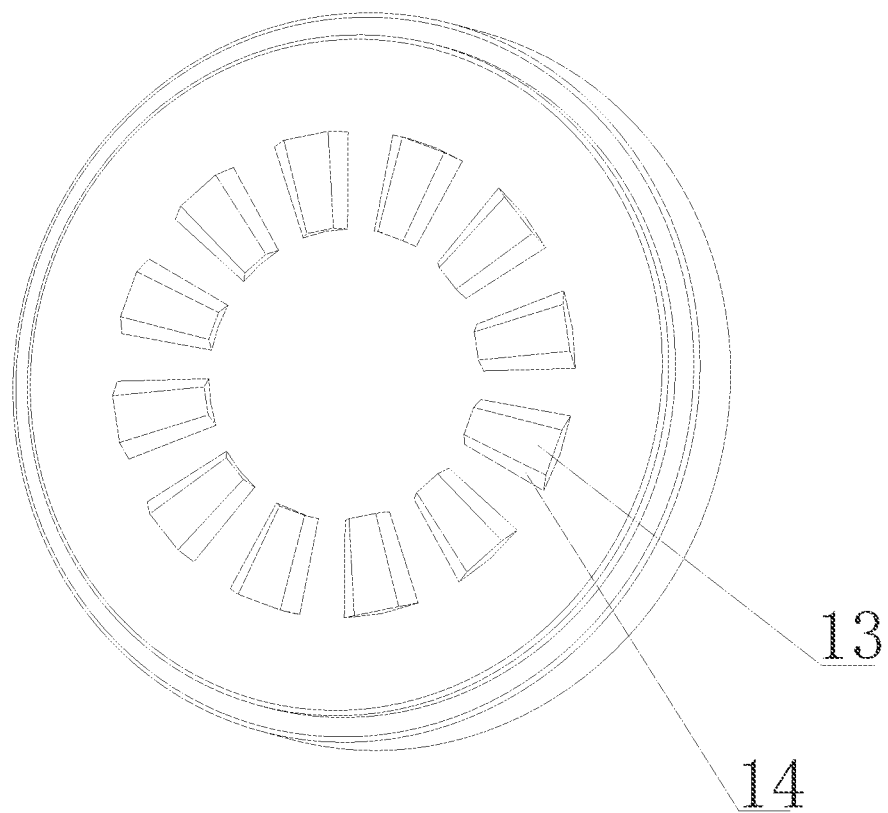
FIG. 9 is a structural diagram 2 of a floating impact gear of an embodiment 1 of the present disclosure.
Figure 10:
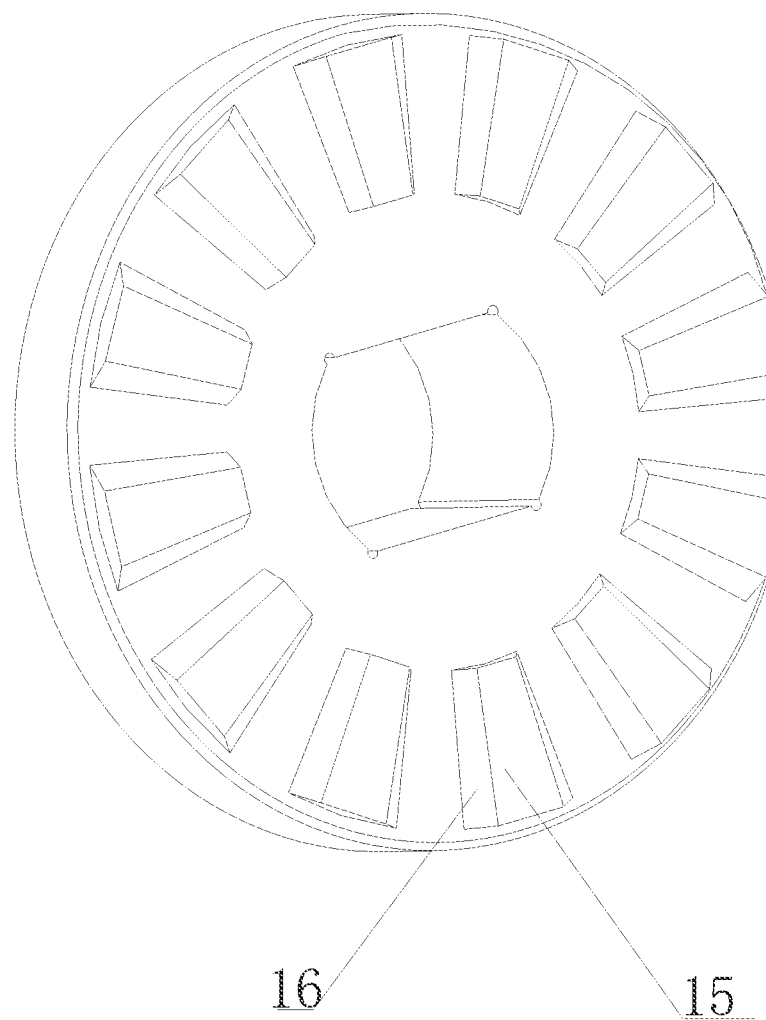
FIG. 10 is a structural diagram of an output impact gear of an embodiment 1 of the present disclosure.
Figure 11:
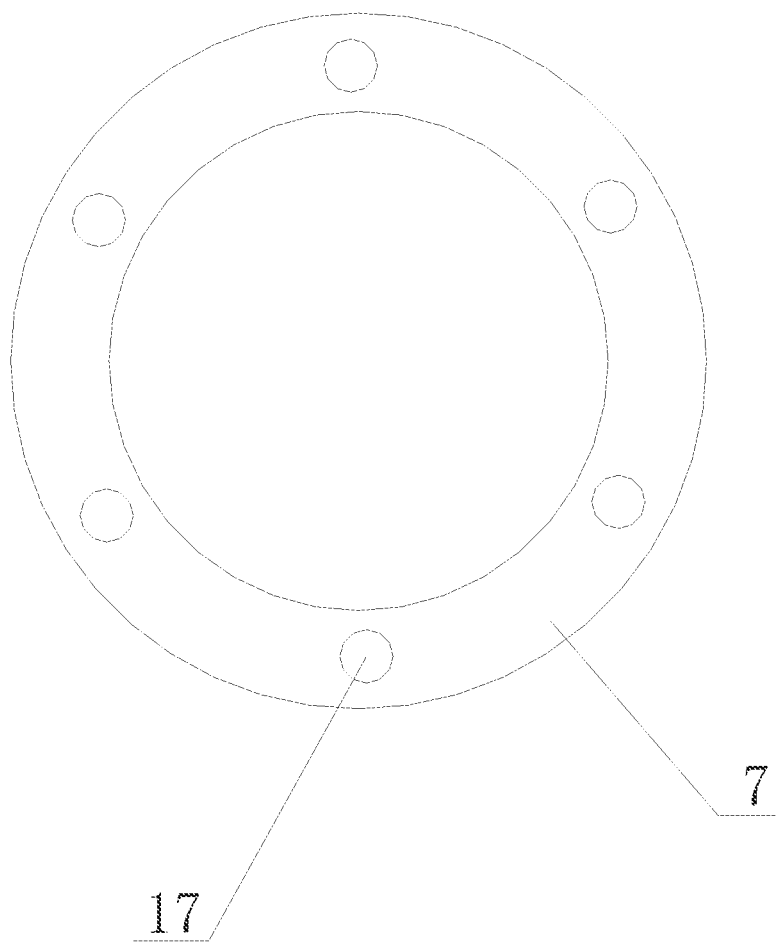
FIG. 11 is a structural schematic diagram illustrating a frictional plate according to an embodiment 2 of the present disclosure.

Numerals of the drawings are described below: 1. input impact gear, 2. central shaft hole, 3. floating impact gear, 4. output impact gear, 5. output shaft, 6. housing, 7. frictional plate, 8. thrust spring, 9. first convex tooth, 10. first oblique surface, 11. second convex teeth, 12. second oblique surface, 13. third convex teeth, 14. third oblique surface, 15. fourth convex teeth, 16. fourth oblique surface, 17. magnetic modular sheet.

DETAILED DESCRIPTIONS OF EMBODIMENTS

The present disclosure will be further described in combination with drawings 1 to 11 and embodiments 1 to 2.

Embodiment 1: there is provided a mechanical backstop, comprising a housing 6, an input impact gear 1, a frictional plate 7, a floating impact gear 3, and an output impact gear 4. A central shaft hole 2 connected with a transmission shaft of an external motor is disposed on the input impact gear 1 to receive power. The output impact gear 4 is connected with an output shaft 5 which protrudes out of the housing 6 to output power. The input impact gear 1, the frictional plate 7, the floating impact gear 3, and the output impact gear 4 are all mounted inside the housing 6. The floating impact gear 3 is movably mounted between the input impact gear 1 and the output impact gear 4 to achieve positive transmission and negative locking. The frictional plate 7 is fixed relative to the housing 6 and disposed at a side of the floating impact gear 3 close to the input impact gear 1. When the input impact gear 1 transmits a torque to the floating impact gear 3, the floating impact gear 3 floats toward the output impact gear 4 to separate from the frictional plate 7 and transmit the torque to the output impact gear 4. When the floating impact gear 3 transmits a torque reversely, the floating impact gear 3 floats toward the input impact gear 1 to abut against the frictional plate 7 and achieve reverse locking.

A plurality of circumferentially-distributed first convex teeth 9 are disposed on an end surface of the input impact gear 1 facing toward the floating impact gear 3, and first oblique surfaces 10 are disposed on side surfaces of the first convex teeth 9. A plurality of circumferentially-distributed second convex teeth 11 are disposed on an end surface of the floating impact gear 3 facing toward the input impact gear 1. The second convex teeth 11 and the first convex teeth 9 are in engagement cooperation. Second oblique surfaces 12 corresponding to the first oblique surfaces 10 are disposed on the second convex teeth 11. When the input impact gear 1 transmits a torque to the floating impact gear 3, due to engagement transmission of the first convex teeth 9 and the second convex teeth 11 and oblique surface cooperation of the first oblique surfaces 10 and the second oblique surfaces 12, the floating impact gear 3 floats toward the output impact gear 4 to separate from the frictional plate 7 and transmit the torque to the output impact gear 4, so as to achieve normal transmission of the torque. In other words, when the input impact gear 1 drives the floating impact gear 3, the floating impact gear 3 runs from the input impact gear 1 toward the output impact gear 4 due to inertial force and thus separates from the frictional plate 7 to remove the control of the frictional force of the frictional plate 7 over the floating impact gear 3, thus completing normal transmission. The first convex teeth 9 and/or the second convex teeth 11 are trapezoidal teeth which promote normal torque transmission and transmission of larger torque.

A plurality of circumferentially-distributed third convex teeth 13 are disposed on an end surface of the floating impact gear 3 facing toward the output impact gear 4, and third oblique surfaces 14 are disposed on side surfaces of the third convex teeth 13. A plurality of circumferentially-distributed fourth convex teeth 15 are disposed on an end surface of the output impact gear 4 facing toward the floating impact gear 3, and fourth oblique surfaces 16 are disposed on side surfaces of the fourth convex teeth 15. The fourth convex teeth 15 and the third convex teeth 13 are in engagement cooperation, and the fourth oblique surfaces 16 and the third oblique surfaces 14 are in corresponding cooperation. When a torque is reversely transmitted from the output impact gear 4 to the floating impact gear 3, due to engagement transmission of the fourth convex teeth 15 and the third convex teeth 13 and oblique surface cooperation of the fourth oblique surfaces 16 and the third oblique surfaces 14, the floating impact gear 3 floats toward the input impact gear 1 to abut against the frictional plate 7 so as to achieve reverse locking. In other words, when the output impact gear 4 drives the floating impact gear 3, the floating impact gear 3 runs from the output impact gear 4 toward the input impact gear 1 due to inertial force to abut against the frictional plate 7 and thus the floating impact gear 3 is reversely locked due to a frictional resistance of the frictional plate 7. The third convex teeth 13 and/or the fourth convex teeth 15 are trapezoidal teeth which promote normal torque transmission and transmission of larger torque.

An elastic piece is disposed inside the housing 6, and the elastic piece is used to produce an elastic acting force for moving the floating impact gear 3 toward the frictional plate 7. The elastic piece is a thrust spring 8 disposed in a mounting chamber in the housing 6. An end of the thrust spring 8 is connected with an inner wall of the mounting chamber and the other end of the thrust spring 8 is connected with an end of the floating impact gear 3 corresponding to the output impact gear 4. The disposal of the elastic piece can better reset the floating impact gear 3 to abut against the frictional plate 7 so as to increase the frictional resistance, and on the other hand, better achieve reverse braking without affecting the positive drive of the input impact gear 1 on the floating impact gear 3.

The working principle: when the input impact gear 1 transmits a torque to the floating impact gear 3, the first convex teeth 9 and the second convex teeth 11 are in engagement transmission, and the first oblique surfaces 10 and the second oblique surfaces 12 achieve close fitting. During transmission, due to the effect of inertial force, the first oblique surfaces 10 and the second oblique surfaces 12 are staggeredly slid, and thus, the floating impact gear 3 is pushed outward relative to the input impact gear 1 so as to transmit the torque to the output impact gear 4. In other words, when the input impact gear 1 drives the floating impact gear 3, the floating impact gear 3 runs from the input impact gear 1 toward the output impact gear 4 due to the inertial force, and thus separates from the frictional plate 7 to remove the control of the frictional force of the frictional plate 7 over the floating impact gear 3, thus completing normal transmission of the torque.

When a torque is reversely transmitted from the output impact gear 4 to the floating impact gear 3, the fourth convex teeth 15 and the third convex teeth 13 are in engagement transmission, and the fourth oblique surfaces 16 and the third oblique surfaces 14 achieve close fitting. Due to the effect of the inertial force, the third oblique surfaces 14 and the fourth oblique surfaces 16 are staggeredly slid, and thus the floating impact gear 3 floats toward the input impact gear 1 to abut against the frictional plate 6 and achieve reverse locking. In other words, when the output impact gear 4 drives the floating impact gear 3, the floating impact gear 3 runs from the output impact gear 4 to the input impact gear 1 due to the inertial force to abut against the frictional plate 7, and thus the floating impact gear 3 is reversely locked due to the frictional resistance of the frictional plate 7. In this case, the floating impact gear 3 cannot drive the input impact gear 1 reversely.

Embodiment 2: there is provided a mechanical backstop, comprising: a housing 6, an input impact gear 1, a frictional plate 7, a floating impact gear 3, and an output impact gear 4. A central shaft hole 2 connected with a transmission shaft of an external motor is disposed on the input impact gear 1 to receive power. The output impact gear 4 is connected with an output shaft 5 which protrudes out of the housing 6 to output power. The input impact gear 1, the frictional plate 7, the floating impact gear 3, and the output impact gear 4 are all mounted inside the housing 6. The floating impact gear 3 is movably mounted between the input impact gear 1 and the output impact gear 4 to achieve one-way transmission and reverse locking. The frictional plate 7 is fixed relative to the housing 6 and disposed at a side of the floating impact gear 3 close to the input impact gear 1. When the input impact gear 1 transmits a torque to the floating impact gear 3, the floating impact gear 3 floats toward the output impact gear 4 to separate from the frictional plate 7 and transmit the torque to the output impact gear 4. When the floating impact gear 3 transmits a torque reversely, the floating impact gear 3 floats toward the input impact gear 1 to abut against the frictional plate 7 and achieve reverse locking.

A plurality of circumferentially-distributed first convex teeth 9 are disposed on an end surface of the input impact gear 1 facing toward the floating impact gear 3, and first oblique surfaces 10 are disposed on side surfaces of the first convex teeth 9. A plurality of circumferentially-distributed second convex teeth 11 are disposed on an end surface of the floating impact gear 3 facing toward the input impact gear 1. The second convex teeth 11 and the first convex teeth 9 are in engagement cooperation. Second oblique surfaces 12 corresponding to the first oblique surfaces 10 are disposed on the second convex teeth 11. When the input impact gear 1 transmits a torque to the floating impact gear 3, due to engagement transmission of the first convex teeth 9 and the second convex teeth 11 and oblique surface cooperation of the first oblique surfaces 10 and the second oblique surfaces 12, the floating impact gear 3 floats toward the output impact gear 4 to separate from the frictional plate 7 and transmit the torque to the output impact gear 4, so as to achieve normal transmission of the torque. In other words, when the input impact gear 1 drives the floating impact gear 3, the floating impact gear 3 runs from the input impact gear 1 toward the output impact gear 4 due to inertial force and thus separates from the frictional plate 7 to remove the control of the frictional force of the frictional plate 7 over the floating impact gear 3, thus completing normal transmission. The first convex teeth 9 and/or the second convex teeth 11 are trapezoidal teeth which promote normal torque transmission and transmission of larger torque.

A plurality of circumferentially-distributed third convex teeth 13 are disposed on an end surface of the floating impact gear 3 facing toward the output impact gear 4, and third oblique surfaces 14 are disposed on side surfaces of the third convex teeth 13. A plurality of circumferentially-distributed fourth convex teeth 15 are disposed on an end surface of the output impact gear 4 facing toward the floating impact gear 3, and fourth oblique surfaces 16 are disposed on side surfaces of the fourth convex teeth 15. The fourth convex teeth 15 and the third convex teeth 13 are in engagement cooperation, and the fourth oblique surfaces 16 and the third oblique surfaces 14 are in corresponding cooperation. When a torque is reversely transmitted from the output impact gear 4 to the floating impact gear 3, due to engagement transmission of the fourth convex teeth 15 and the third convex teeth 13 and oblique surface cooperation of the fourth oblique surfaces 16 and the third oblique surfaces 14, the floating impact gear 3 floats toward the input impact gear 1 to abut against the frictional plate 7 so as to achieve reverse locking. In other words, when the output impact gear 4 drives the floating impact gear 3, the floating impact gear 3 runs from the output impact gear 4 toward the input impact gear 1 due to the inertial force to abut against the frictional plate 7 and thus the floating impact gear 3 is reversely locked due to a frictional resistance of the frictional plate 7. The third convex teeth 13 and/or the fourth convex teeth 15 are trapezoidal teeth which promote normal torque transmission and transmission of larger torque.

The frictional plate 7 is an annular structure. A plurality of circumferentially-distributed magnetic modular sheets 17 are disposed in the frictional plate 7. The magnetic modular sheets 17 and the floating impact gear 3 achieve magnetic attraction cooperation. In this way, the reversely-locking frictional resistance can be better increased without affecting the positive drive of the input impact gear 1 on the floating impact gear 3.

Apparently, the above embodiments of the present disclosure are merely used as examples to describe the present disclosure rather than limit the embodiments of the present disclosure. For those skilled in the art, various changes or modifications can be made to the above descriptions. Herein, all embodiments are not necessarily and even cannot be exhausted. Those apparent changes or modifications derived from the essence spirit of the present disclosure still fall within the scope of protection of the present disclosure.

The invention claimed is:

1. A mechanical backstop, comprises a housing, an input impact gear, a frictional plate, a floating impact gear, and an output impact gear, wherein the floating impact gear is movably mounted between the input impact gear and the output impact gear to achieve transmission; the frictional plate is fixed relative to the housing and disposed at a side of the floating impact gear close to the input impact gear;

when the input impact gear transmits a torque to the floating impact gear, the floating impact gear floats toward the output impact gear to separate from the frictional plate and transmit the torque to the output impact gear, when the output impact gear transmits a torque to the floating impact gear, the floating impact gear floats toward the input impact gear to abut against the frictional plate and achieve reverse locking, wherein an elastic piece is disposed inside the housing, and the elastic piece is used to produce an elastic acting force for moving the floating impact gear toward the frictional plate, and the elastic piece is a thrust spring, and the thrust spring is disposed in a mounting chamber in the housing; an end of the thrust spring is connected with an inner wall of the mounting chamber and the other end of the thrust spring is connected with an end of the floating impact gear adjacent to the output impact gear.

2. The mechanical backstop of claim 1, wherein a plurality of circumferentially-distributed first convex teeth are disposed on an end surface of the input impact gear facing toward the floating impact gear, and first oblique surfaces are disposed on side surfaces of the first convex teeth;

a plurality of circumferentially-distributed second convex teeth are disposed on an end surface of the floating impact gear facing toward the input impact gear; the second convex teeth and the first convex teeth are in engagement cooperation and second oblique surfaces corresponding to the first oblique surfaces are disposed on the second convex teeth.

3. The mechanical backstop of claim 2, wherein the first convex teeth and/or the second convex teeth are trapezoidal teeth.

4. The mechanical backstop of claim 1, wherein a plurality of circumferentially-distributed third convex teeth are disposed on an end surface of the floating impact gear facing toward the output impact gear, and third oblique surfaces are disposed on side surfaces of the third convex teeth;

a plurality of circumferentially-distributed fourth convex teeth are disposed on an end surface of the output impact gear facing toward the floating impact gear, and fourth oblique surfaces are disposed on side surfaces of the fourth convex teeth; the fourth convex teeth and the third convex teeth are in engagement cooperation, and the fourth oblique surfaces and the third oblique surfaces are in corresponding cooperation.

5. The mechanical backstop of claim 4, wherein the third convex teeth and/or the fourth convex teeth are trapezoidal teeth.

6. A mechanical backstop, comprises a housing, an input impact gear, a frictional plate, a floating impact gear, and an output impact gear, wherein the floating impact gear is movably mounted between the input impact gear and the output impact gear to achieve transmission; the frictional plate is fixed relative to the housing and disposed at a side of the floating impact gear close to the input impact gear;

when the input impact gear transmits a torque to the floating impact gear, the floating impact gear floats toward the output impact gear to separate from the frictional plate and transmit the torque to the output impact gear, when the output impact gear transmits a torque to the floating impact gear, the floating impact gear floats toward the input impact gear to abut against the frictional plate and achieve reverse locking, wherein the frictional plate is an annular structure; a plurality of circumferentially-distributed magnetic modular sheets are disposed in the frictional plate; the magnetic modular sheets and the floating impact gear achieve magnetic attraction cooperation.

7. The mechanical backstop of claim 1, wherein the output impact gear is connected with an output shaft, and the output shaft protrudes out of the housing.

* * * * *